(No Model.)
C. L. PEPPER.
IMPLEMENT FOR REPAIRING PNEUMATIC TIRES.
No. 565,413. Patented Aug. 4, 1896.
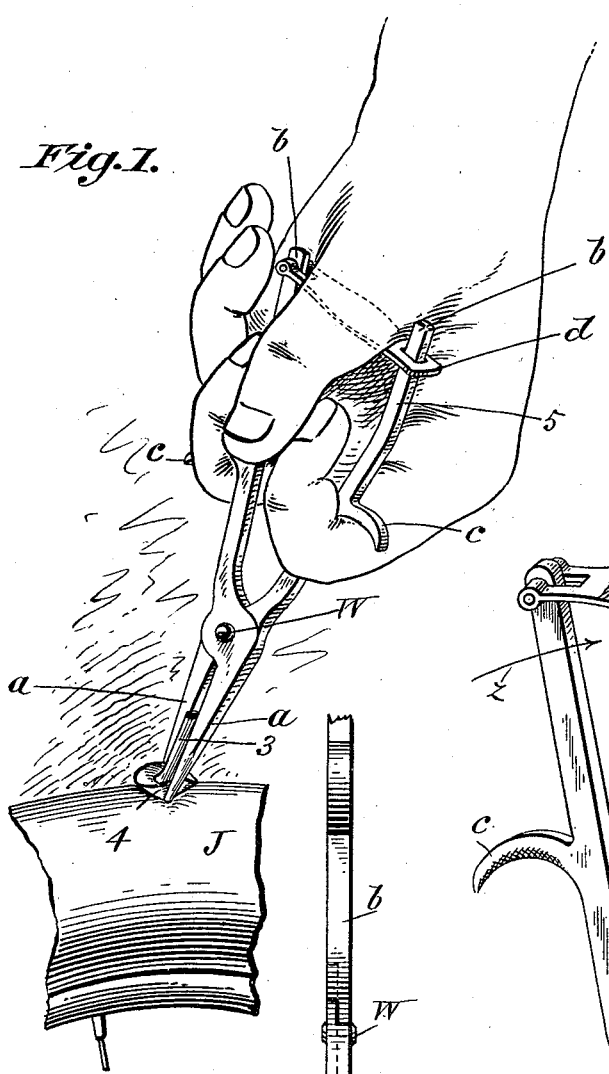
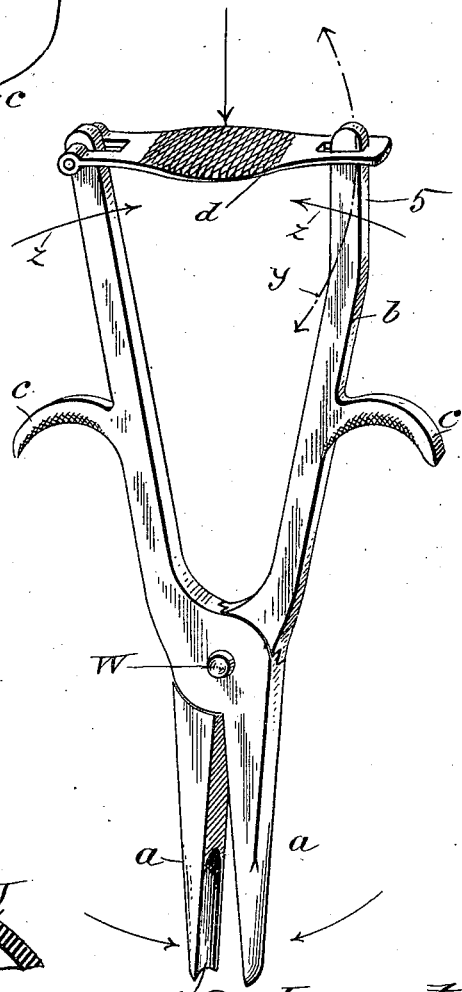
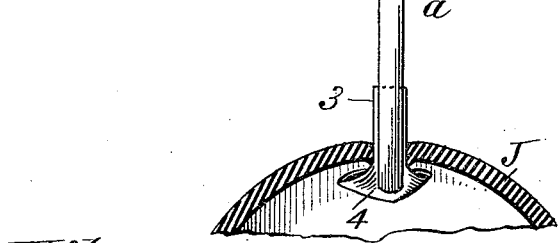
Witnesses:
J. W. Garfield
H. S. Clemons
Inventor:
Charles L. Pepper,
by Chapin
Attorneys.
THE NORRIS PETERS CO., PHOTO-LITHO., WASHINGTON, D. C.

UNITED STATES PATENT OFFICE.

CHARLES L. PEPPER, OF CHICOPEE FALLS, MASSACHUSETTS, ASSIGNOR TO THE SPAULDING & PEPPER COMPANY, OF SAME PLACE.

IMPLEMENT FOR REPAIRING PNEUMATIC TIRES.

SPECIFICATION forming part of Letters Patent No. 565,413, dated August 4, 1896.

Application filed December 5, 1895. Serial No. 571,191. (No model.)

*To all whom it may concern:*

Be it known that I, CHARLES L. PEPPER, a citizen of the United States of America, residing at Chicopee Falls, in the county of Hampden and State of Massachusetts, have invented new and useful Improvements in Implements for Repairing Pneumatic Tires, of which the following is a specification.

This invention relates to implements for repairing pneumatic tires, and particularly to an improved tool for holding and inserting a rubber pin or plug into one of said tires through a puncture therein and bringing the head of said pin to a position to cover said puncture on the inner surface of said tire; and the invention consists in the peculiar construction and arrangement of the several parts of said pin-inserting tool, all as hereinafter fully described, and more particularly pointed out in the claims.

In the drawings forming part of this specification, Figure 1 is a perspective view of a pin-inserting tool embodying my improvements, said figure illustrating the position of said tool in the hand of an operator and showing a pin held by said tool and its position relative to a tire when a pin is to be inserted therein. Fig. 2 is a perspective view of said tool with its jaws open and of a tire-repairing plug. Fig. 3 is a cross-section of a part of a tire, showing the tool in edge view holding a repair-plug inside of said tire.

In the drawings, $a$ $a$ indicate the jaws of the tool. In each opposite side of each jaw is formed a concave groove $x$ to receive the stem 3 of the repair-plug, 4 being the head thereof. Each of said jaws is integral with a handle $b$, and on each handle is preferably formed a curved finger-rest $c$, extending outwardly therefrom, as shown. Said jaw and handle parts are pivoted together at $w$. One of said handles has its extremity 5 inclined toward the opposite handle for the purpose below described. A flat yoke $d$ is pivoted by one end to the extremity of one of said handles $b$, and its free end is perforated to receive the end of the opposite handle, whose extremity is, as aforesaid, inclined toward the opposite handle, or that one to which said yoke is pivoted. Said yoke $d$ is preferably knurled or otherwise roughened on its outer face to give the operator a firmer hold against it when using the tool, as below described, and with the hand in the gripping position shown in Fig. 1.

In Figs. 1 and 3, J indicates a portion of a punctured pneumatic tire. It is well known to those familiar with the use of such tires that the cutting or puncturing thereof produced by their contact on a road with tacks, broken glass, or other sharp cutting objects is a constant source of annoyance and trouble, and the use of a plug of soft rubber of the form herein shown and described has been found to be one of the most efficient means of quickly and efficiently repairing said punctured tires, but heretofore a tool for satisfactorily manipulating said plug for placing it in a tire has not been available; but the implement constructed as herein described enables one to quickly and efficiently effect said repairs.

In operating said implement and plug for stopping an opening in the tire J caused by puncturing, as aforesaid, a suitable cement is first applied to the flat side of the head 4 of said plug or to that face thereof which adjoins the stem 3 of the same. The plug is then grasped by the jaws $a$ $a$ of the implement in the manner shown in Fig. 1, whereby the two opposite edges of its head are folded up against the sides of the stem of the plug, said stem lying in said concave grooves $x$ of the jaws of the tool. To hold the plug in said position against the elastic resistance of the rubber substance of the plug and firmly enough to retain the plug in place between said jaws while it is forced through the side of the tire J to the position shown in Fig. 3 requires an uncommonly firm grip upon said plug and one which is of increasing force proportionate to the increasing resistance which is encountered from the time the plug is first forced against the punctured part of said tire, (through which, generally, is a very small opening,) as shown in Fig. 1, to that in which the plug is brought to the position shown in Fig. 3, with its head 4 inside of said tire. To the end that said firm and increasingly-forcible grip of said plug may be effected the above-described flat yoke $d$ is provided, in which the free end thereof has a sliding engagement with the extremity 5 of one of said handles $b$. In practice said free end of the yoke $d$ occupies about the position shown in Figs. 1 and 2 when the tool is first gripped upon the plug, and at this stage of the operation the thumb of the operator is passed over and bears against the outer side of said yoke, while the fingers clasp around said finger-rests $c$ $c$, as shown. Thus by pressing the hand against said yoke to force the plug through the tire the free end of said yoke is gradually forced downwardly in the direction indicated by the arrow $y$, Fig. 2, thus moving the extremities of the handles $b$ $b$ toward each other in the directions indicated by the arrows $z$ $z$ in said last-named figure, causing the tool to grip the plug tighter and tighter. The said inclined position of the extremity 5 of one of said handles $b$ brings said extremity into proper position for said increasing gripping action due to the downward movement of the free end of said yoke thereon.

Having thus described my invention, what I claim, and desire to secure by Letters Patent, is—

1. An implement for inserting repair-plugs into pneumatic tires, consisting of the jaws thereof having oppositely-arranged concave grooves therein, each jaw having a handle integral therewith, which jaw and handle parts are pivotally united, combined with a flat-faced yoke pivotally connected by one end to the extremity of one of said handles, and having a sliding engagement by its free end with the opposite handle of the implement, whereby by the movement of said yoke, the gripping force of said jaws is gradually increased, substantially as set forth.

2. An implement for inserting repair-plugs into pneumatic tires, consisting of the jaws $a$, $a$, and a handle extremity $b$, integral therewith, said combined jaw and handle parts being pivotally united, combined with a flat-faced yoke $d$, pivotally connected by one end with the extremity of one of said handles, and having a sliding engagement with the extremity of the opposite handle, whereby, by the movement of said yoke, the gripping force of said jaws is gradually increased, substantially as set forth.

3. An implement for inserting repair-plugs into pneumatic tires, consisting of the jaws $a$, $a$, and a handle extremity $b$, integral therewith, each of said handles having thereon a finger-rest $c$, said combined jaw and handle parts being pivotally united, combined with a flat-faced yoke $d$, pivotally connected by one end with the extremity of one of said handles, and having a sliding engagement with the extremity of the opposite handle, whereby, by the movement of said yoke, the gripping force of said jaws is gradually increased, substantially as set forth.

CHARLES L. PEPPER.

Witnesses:
H. A. CHAPIN,
K. I. CLEMONS.